United States Patent
Kullman et al.

(10) Patent No.: US 12,340,346 B1
(45) Date of Patent: Jun. 24, 2025

(54) CONSUMER ENGAGEMENT AND MANAGEMENT PLATFORM USING MACHINE LEARNING FOR INTENT DRIVEN ORCHESTRATION

(71) Applicant: Allstate Insurance Company, Northbrook, IL (US)

(72) Inventors: J. Wayne Kullman, Glenview, IL (US); Thomas Pearson, Northbrook, IL (US); Dan Maloney, Northbrook, IL (US); Vinith George, Northbrook, IL (US); Natalie Merlo, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/385,315

(22) Filed: Jul. 26, 2021

Related U.S. Application Data

(60) Provisional application No. 63/056,791, filed on Jul. 27, 2020.

(51) Int. Cl.
  *G06Q 10/10* (2023.01)
  *G06F 18/214* (2023.01)
  (Continued)

(52) U.S. Cl.
  CPC ......... *G06Q 10/10* (2013.01); *G06F 18/2155* (2023.01); *G06N 20/00* (2019.01);
  (Continued)

(58) Field of Classification Search
  CPC ........ G06Q 40/08; G06Q 10/10; G06Q 30/01; G06Q 30/0283
  See application file for complete search history.

(56) References Cited

U.S. PATENT DOCUMENTS 9,509,782 B2  11/2016  Lawson et al.
10,069,891 B2  9/2018  Mohammad et al.
(Continued)

FOREIGN PATENT DOCUMENTS

CN  108418862 A  8/2018
CN  110162414 A  8/2019
(Continued)

OTHER PUBLICATIONS

Dooley, Brian J., "AI as a Platform-as-a-Service", TDWI, https://tdwi.org/articles/2017/06/29/ai-as-platform-as-a-service.aspx, Jun. 29, 2017 (4 pages).
(Continued)

*Primary Examiner* — Scott S Trotter
*Assistant Examiner* — William D Newlon
(74) *Attorney, Agent, or Firm* — Dinsmore & Shohl LLP

(57) ABSTRACT

Aspects of the disclosure relate to computing platforms that utilize machine learning to perform output generation based on intent identification. The computing platform may train intent orchestration models (e.g., intent identification, output generation, or communication channel) using historical data. The computing platform may data corresponding to an individual. Based on the data, the computing platform may select intent identification models, and may use them to identify an intent. Based on the intent of the individual, the computing platform may select engagement output generation models, and may use them to generate a customer engagement output. The computing platform may use a communication channel model to identify a communication channel. The computing platform may send commands directing display of the customer engagement output, which may cause a user device to display the customer engagement output using the communication channel.

19 Claims, 9 Drawing Sheets

(51) Int. Cl.
*G06N 20/00* (2019.01)
*G06Q 30/01* (2023.01)
*G06Q 30/0283* (2023.01)
*G06Q 40/08* (2012.01)

(52) U.S. Cl.
CPC ......... *G06Q 30/01* (2013.01); *G06Q 30/0283* (2013.01); *G06Q 40/08* (2013.01)

(56) References Cited

U.S. PATENT DOCUMENTS

| | | | |
|---|---|---|---|
| 10,261,891 B2 | 4/2019 | Rajagopalan et al. | |
| 10,275,235 B2 | 4/2019 | Buehler et al. | |
| 10,382,300 B2 | 8/2019 | Ellenbogen et al. | |
| 11,042,784 B2* | 6/2021 | Jelveh | G06F 18/41 |
| 11,544,470 B2* | 1/2023 | Zhang | G10L 15/16 |
| 11,715,111 B2* | 8/2023 | Teo | G06Q 30/016 |
| | | | 705/304 |
| 2013/0268468 A1* | 10/2013 | Vijayaraghavan | G06N 20/00 |
| | | | 706/12 |
| 2013/0282430 A1* | 10/2013 | Kannan | G06Q 30/02 |
| | | | 705/7.29 |
| 2015/0149218 A1* | 5/2015 | Bayley | B60R 21/0136 |
| | | | 705/4 |
| 2016/0162819 A1 | 6/2016 | Hakman et al. | |
| 2017/0024717 A1 | 1/2017 | Istrati | |
| 2017/0034016 A1 | 2/2017 | Carroll et al. | |
| 2017/0091629 A1* | 3/2017 | Li | G06N 20/00 |
| 2017/0346823 A1* | 11/2017 | Wadley | G06Q 50/01 |
| 2018/0165604 A1 | 6/2018 | Minkin et al. | |
| 2018/0276553 A1* | 9/2018 | Redkar | G06N 20/00 |
| 2018/0295194 A1 | 10/2018 | Deraz et al. | |
| 2019/0019090 A1 | 1/2019 | Chacko et al. | |
| 2019/0102155 A1 | 4/2019 | Garvey et al. | |
| 2019/0311374 A1 | 10/2019 | Dai et al. | |
| 2019/0320038 A1 | 10/2019 | Walsh et al. | |
| 2019/0332522 A1 | 10/2019 | Leydon et al. | |
| 2019/0354809 A1 | 11/2019 | Ralhan | |
| 2019/0378149 A1* | 12/2019 | Gao | G06Q 10/0637 |
| 2020/0045173 A1 | 2/2020 | St-Cyr et al. | |
| 2020/0159790 A1* | 5/2020 | Barbosa | G06F 16/9558 |
| 2021/0042786 A1* | 2/2021 | Tiruveedhula | G06N 20/10 |
| 2021/0193124 A1* | 6/2021 | Razin | G06F 40/30 |
| 2021/0303317 A1* | 9/2021 | Sanghvi | G06F 16/9035 |
| 2024/0143345 A1* | 5/2024 | Fields | G06N 20/00 |

FOREIGN PATENT DOCUMENTS

| | | |
|---|---|---|
| CN | 110362494 A | 10/2019 |
| WO | 2018144060 A1 | 8/2018 |

OTHER PUBLICATIONS

Gain, Cameron, "Machine Learning, Microservices, and Kubernetes", The New Stack, https://thenewstack.io/machine-learning-microservices-and-kubernetes/, Feb. 28, 2019 (3 pages).

Henley, Martin, "How AI and Microservices Create a Reliable Enterprise of the Future", DevOps, https://devops.com/how-ai-and-microservices-create-a-reliable-enterprise-of-the-future/, Sep. 24, 2019 (3 pages).

Murugesan, Mallesh, "Deploy AI Models as Microservice", Abeyon, https://abeyon.com/deploy-ai-models-as-microservice/, Feb. 12, 2019 (4 pages).

Shivakumar Goniwada Rudrappa, "Microservices Architecture in Artificial Intelligence", https://devops.com/how-ai-and-microservices-create-a-reliable-enterprise-of-the-future/, Jun. 26, 2019 (7 pages).

* cited by examiner

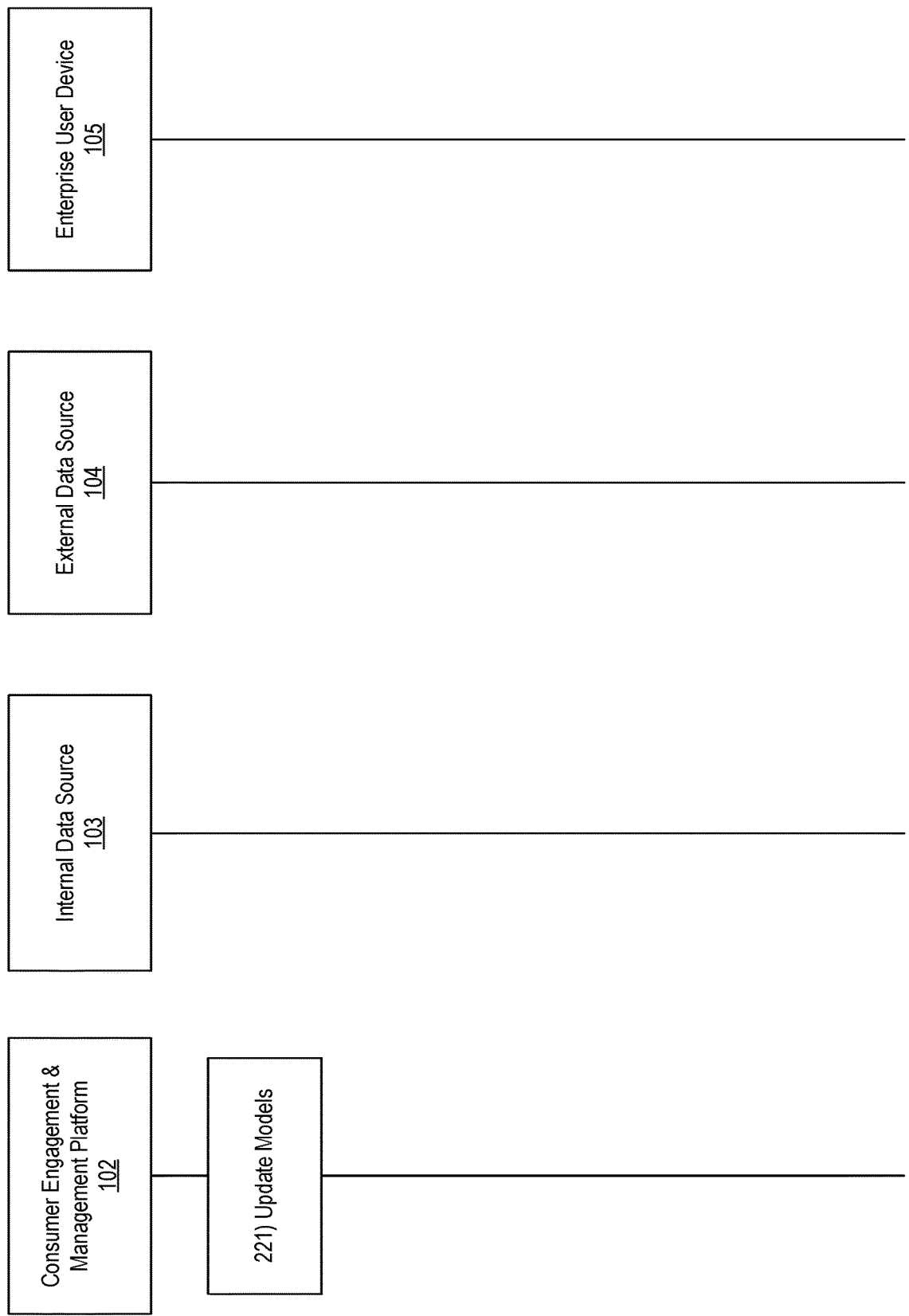

405

Chatbot Interface

Bot: It looks like you are purchasing a vehicle, would you like assistance purchasing insurance?

Customer: Yes, please assist.

Bot: We have assembled a quote for you, please click here to review and purchase.

Push Notification

It appears you experienced a collision, don't forget to file your claim. Please click here to initiate the filing.

FIG. 5

CONSUMER ENGAGEMENT AND MANAGEMENT PLATFORM USING MACHINE LEARNING FOR INTENT DRIVEN ORCHESTRATION

CROSS-REFERENCE TO RELATED CASES

The present application claims priority to U.S. Provisional Application No. 63/056,791 filed on Jul. 27, 2020, and entitled "Consumer Engagement and Management Platform Using Machine Learning for Intent Driven Orchestration," which is hereby incorporated by reference as to its entirety.

BACKGROUND

Aspects of the disclosure relate to enhanced processing systems for executing machine learning algorithms to determine customer engagement outputs. Many organizations and individuals may use machine learning models to make specific determinations. In many instances, however, these models may be built for a specific purpose, and might not enable flexibility and/or integration between the models. Accordingly, it may be difficult for enterprise organizations to leverage the full capabilities of machine learning and/or artificial intelligence to provide automated services.

SUMMARY

Aspects of the disclosure provide effective, efficient, scalable, and convenient technical solutions that address and overcome the technical problems associated with intent identification and output generation for consumer engagement. In accordance with one or more arrangements discussed herein, a computing platform having at least one processor, a communication interface, and memory may receive historical data from a plurality of sources. The computing platform may train one or more intent orchestration models using the historical data, which may include one or more intent identification models, one or more engagement output generation modules, and one or more communication channel modules. The computing platform may identify data corresponding to an individual. Based on the data corresponding to the individual, the computing platform may select one or more intent identification models. Using the selected one or more intent identification models, the computing platform may identify an intent of the individual. Based on the intent of the individual, the computing platform may select one or more engagement output generation models. Using the selected one or more engagement output generation models, the computing platform may generate a customer engagement output. Using one or more communication channel models, the computing platform may select a communication channel. The computing platform may send one or more commands directing an enterprise user device to display the customer engagement output, which may cause the enterprise user device to display the customer engagement output using the communication channel.

In one or more instances, the plurality of sources may include at least an internal data source, storing internal historical data, and an external data source, storing external historical data. In one or more instances, the computing platform may be synced with the plurality of sources and may receive the historical data in real time as it is received by the plurality of sources.

In one or more examples, the historical data may include one or more of: prior call data, prior interaction data, clickstream data, claims data, preferences, and voice transcriptions. In one or more examples, the computing platform may train the one or more intent orchestration models by automatically labelling the historical data to labelled datasets.

In one or more instances, the computing platform may train the one or more intent orchestration models by training one or more supervised learning models, and the one or more supervised learning models may be one or more of: support vector machines models, linear regression models, logistic regression models, naïve Bayes models, linear discriminant analysis models, decision trees models, k-nearest neighbor models, neural networks models, and similarity learning models. In one or more instances, the computing platform may identify the data corresponding to the individual by receiving real-time data corresponding to the individual indicating that the customer engagement output should be generated.

In one or more examples, the real-time data comprises information indicating that the individual was in an accident. In one or more examples, the computing platform may select the one or more intent identification models by selecting one or more of: a model to predict consumer reason for contact, a model to predict importance of consumer need, a model to predict idea product offering/features, a model to predict that a consumer is purchasing a car, a model to predict whether a crash has occurred, and a model to determine a consumer cohort.

In one or more instances, the computing platform may identify the intent by identifying one or more of: what interactions have previously taken place with the individual, how immediate a need is to the individual, what is unique about a situation, a reason for contact, offers/features the individual is interested in, or that the individual is purchasing a car. In one or more instances, the computing platform may identify the intent by one or more of: 1) using voice transcription or clickstream data to identify a reason that the individual contacted an enterprise organization, 2) using demographics or clickstream data to interpret whether the individual is actively browsing options or identify frequently asked questions, 3) using demographics, clickstream data, life events, or social event to determine product offerings, 4) using geospatial triggers, timestamps, or life events to interpret location data, or 5) using telematics data, timestamps, or geospatial triggers to interpret driving data and determine whether a crash occurred.

In one or more examples, the computing platform may select, the one or more engagement output generation models by selecting a model to determine a best method of resolution, a model to determine whether an automated solution or human interaction is appropriate, a model to determine a change in consumer cover needs, a model to determine a type of loss/severity of loss, or a model to determine a best method of contact. In one or more examples, the customer engagement output may be one or more of: a quote, an answer, an amount owed, pricing options, a scheduled inspection, or a claim.

In one or more instances, the computing platform may generate the customer engagement output by 1) identifying a path of resolution based on a reason for customer contact, 2) adding consumer and relevant information to an agent queue based on a determination that the individual is actively browsing options or frequently asked question lists, 3) preparing product recommendations based on clickstream or customer cohort information, 4) preparing a workflow for adding a new car to a policy based on a determination that the individual is visiting dealerships, or 5) preparing a workflow related to filing a claim based on a determination that a crash has occurred.

In one or more embodiments, the computing platform may identify the communication channel by selecting a communication format most likely to provoke consumer engagement with the customer engagement output. In one or more embodiments, the communication channel may be one of: a chatbot, an email, a text, a toggle option, a push notification, a third party application programming interface, a social media post, an automated process, a manual process, or a user interface, and the customer engagement output may be formatted based on the communication channel.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for implementing improved machine learning techniques to dynamically optimize intent driven orchestration of output generation and delivery in accordance with one or more example arrangements discussed herein;

FIGS. 4 and 5 depict illustrative user interfaces for implementing improved machine learning techniques to dynamically optimize intent driven orchestration of output generation and delivery in accordance with one or more example arrangements discussed herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief summary, the description herein provides systems and methods for intent driven orchestration. Intent driven orchestration uses microservices to call on many data sources to gain insight about customers. This data may then be processed through models to determine the intent of the consumer. The system then coordinates actions to help the consumer achieve their intent and deliver an experience. In doing so, the system may select additional models based on outputs of the intent determination models, and use these additional models to determine a most effective output (e.g., both content of the output and method of delivery) for customer engagement. A microservices network construction allows the system to learn by testing different compilations of microservices across subsystems to optimize the system.

In doing so, one or more of the systems and methods described herein may improve ecosystem architecture, intent identification, and output generation for consumer engagement, among other use cases. For example, systems may be built for a specific purpose and to accomplish a particular task. In building environments in such a way, the environments might not enable flexibility to reuse existing components and enable full artificial intelligence and machine learning. The design described herein may allow use of microservices within subsystems to create flexibility through a network of options that become available, and to increase accuracy and efficiency of intent identification and customer engagement.

Figure 1A:
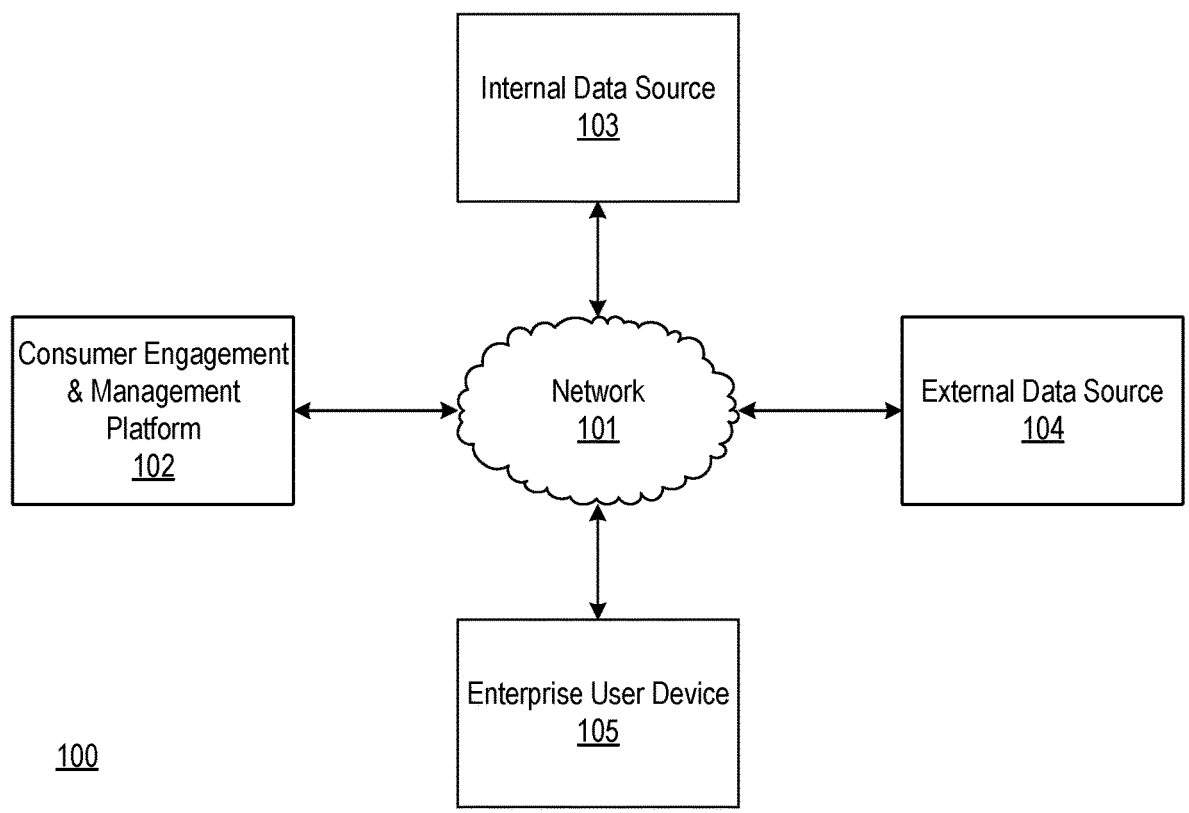
FIGS. 1A-1B depict an illustrative computing environment for implementing improved machine learning techniques to dynamically optimize intent driven orchestration of output generation and delivery in accordance with one or more example arrangements discussed herein.
Figure 1B:
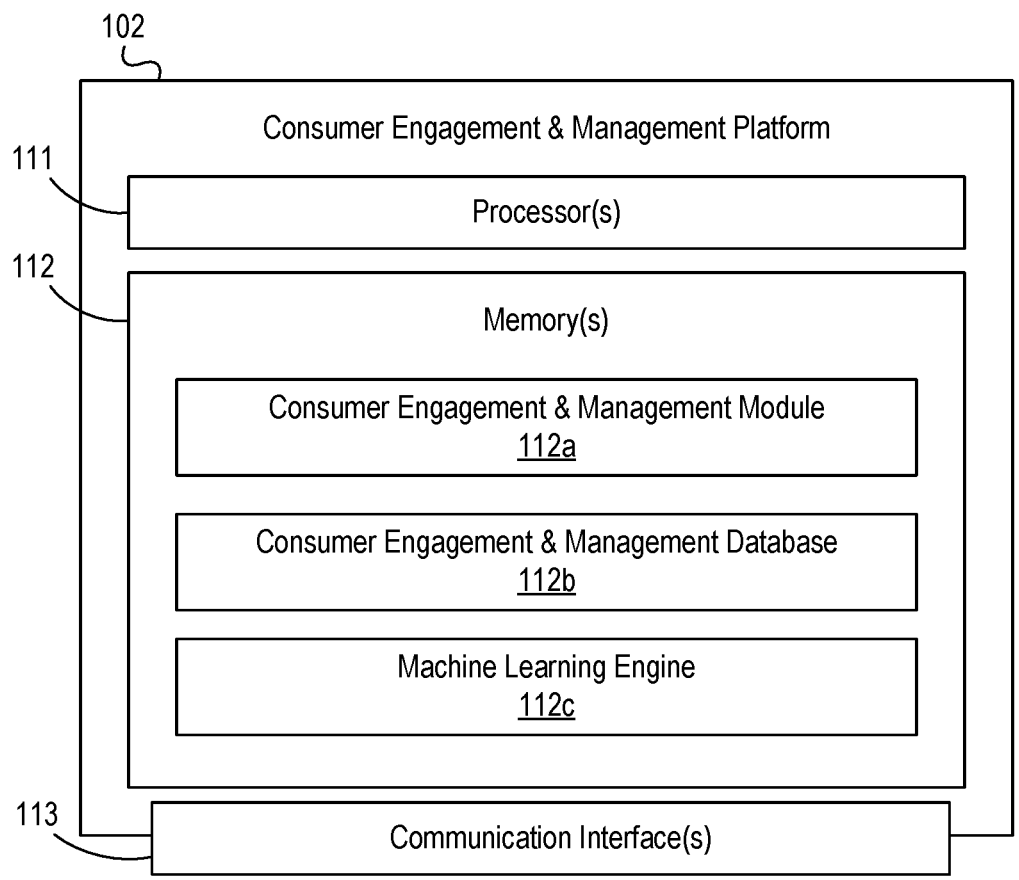

FIGS. 1A and 1B depict an illustrative computing environment for implementing improved machine learning techniques to dynamically optimize intent driven orchestration of output generation and delivery in accordance with one or more example embodiments. Referring to FIG. 1A, computing environment 100 may include one or more computer systems. For example, computing environment 100 may include consumer engagement and management platform 102, internal data source 103, external data source 104, and enterprise user device 105.

As illustrated in greater detail below, consumer engagement and management platform 102 may include one or more computing devices configured to perform one or more of the functions described herein. For example, consumer engagement and management platform 102 may include one or more computer systems, servers, server blades, or the like. In one or more instances, consumer engagement and management platform 102 may be configured to host and/or otherwise maintain one or more machine learning models that may be used in intent identification, output generation, engagement orchestration, or the like. In some instances, the consumer engagement and management platform 102 may be configured to dynamically tune machine learning models and/or algorithms as additional data/feedback is received, detected, or analyzed.

Internal data source 103 may be one or more computing devices (e.g., servers, server blades, or the like) that may be used to host internal customer data relating to an enterprise organization maintaining the internal data source 103. For example, the enterprise organization may be an insurance institution, or the like, and the internal data source 103 may be configured to host user account information, claims data, prior interaction data, clickstream data, or the like.

External data source 104 may be one or more computing devices (e.g., servers, server blades, or the like) that may be used to host external customer data (e.g., for other enterprise organizations). For example, the external data source 104 may be configured to host telematics data, clickstream data, prior interaction data, timestamps, demographics data, life event data, social event data, geospatial data, or the like. In some instances, the network 101 may include one or more external data sources similar to external data source 104.

Enterprise user device 105 may be a computing device (e.g., a smart phone, a tablet, laptop, desktop computer, or the like) that may be used by, for example, a customer or employee of an enterprise organization such as an insurance institution. In some instances, enterprise user device 105 may be used to display one or more consumer engagement outputs (e.g., graphical user interface, message, push notification, or the like) based on an identified customer intent.

Computing environment 100 also may include one or more networks, which may interconnect one or more of consumer engagement and management platform 102, internal data source 103, external data source 104, enterprise user device 105, or the like. For example, computing environment 100 may include a network 101 (which may, e.g., interconnect consumer engagement and management platform 102, internal data source 103, external data source 104, enterprise user device 105, or the like).

In one or more arrangements, consumer engagement and management platform 102, internal data source 103, external data source 104, enterprise user device 105, and/or the other systems included in computing environment 100 may be a computing device capable of and configured for receiving a user interface, receiving input using the user interface, and communicating the received input to one or more other computing devices. For example, consumer engagement and management platform 102, internal data source 103, external data source 104, enterprise user device 105, and/or the other systems included in computing environment 100 may, in some instances, be and/or include server computers, desktop computers, laptop computers, tablet computers, desktop computers, smart phones, sensors, or the like that may include one or more processors, memories, communication interfaces, storage devices, and/or other components. As noted above, and as illustrated in greater detail below, any and/or all of consumer engagement and management platform 102, internal data source 103, external data source 104, and enterprise user device 105 may, in some instances, be special-purpose computing devices configured to perform specific functions.

Referring to FIG. 1B, consumer engagement and management platform 102 may include one or more processors 111, memory 112, and communication interface 113. A data bus may interconnect processor 111, memory 112, and communication interface 113. Communication interface 113 may be a network interface configured to support communication between consumer engagement and management platform 102 and one or more networks (e.g., network 101, or the like). Memory 112 may include one or more program modules having instructions that when executed by processor 111 cause consumer engagement and management platform 102 to perform one or more functions described herein and/or one or more databases that may store and/or otherwise maintain information which may be used by such program modules and/or processor 111. In some instances, the one or more program modules and/or databases may be stored by and/or maintained in different memory units of consumer engagement and management platform 102 and/or by different computing devices that may form and/or otherwise make up consumer engagement and management platform 102. For example, memory 112 may have, store, and/or include consumer engagement and management module 112a, consumer engagement and management database 112b, and a machine learning engine 112c. Consumer engagement and management module 112a may have instructions that direct and/or cause consumer engagement and management platform 102 to execute advanced machine learning techniques for intent identification, output generation and consumer engagement, as discussed in greater detail below. Consumer engagement and management database 112b may store information used by consumer engagement and management module 112a and/or consumer engagement and management platform 102 in analyzing intent identification, output generation, consumer engagement, and/or in performing other functions. Machine learning engine 112c may have instructions that direct and/or cause the consumer engagement and management platform 102 to identify user intents, generate outputs, and perform consumer engagement accordingly, and to set, define, and/or iteratively refine optimization rules and/or other parameters used by the consumer engagement and management platform 102 and/or other systems in computing environment 100.

Figure 2A:
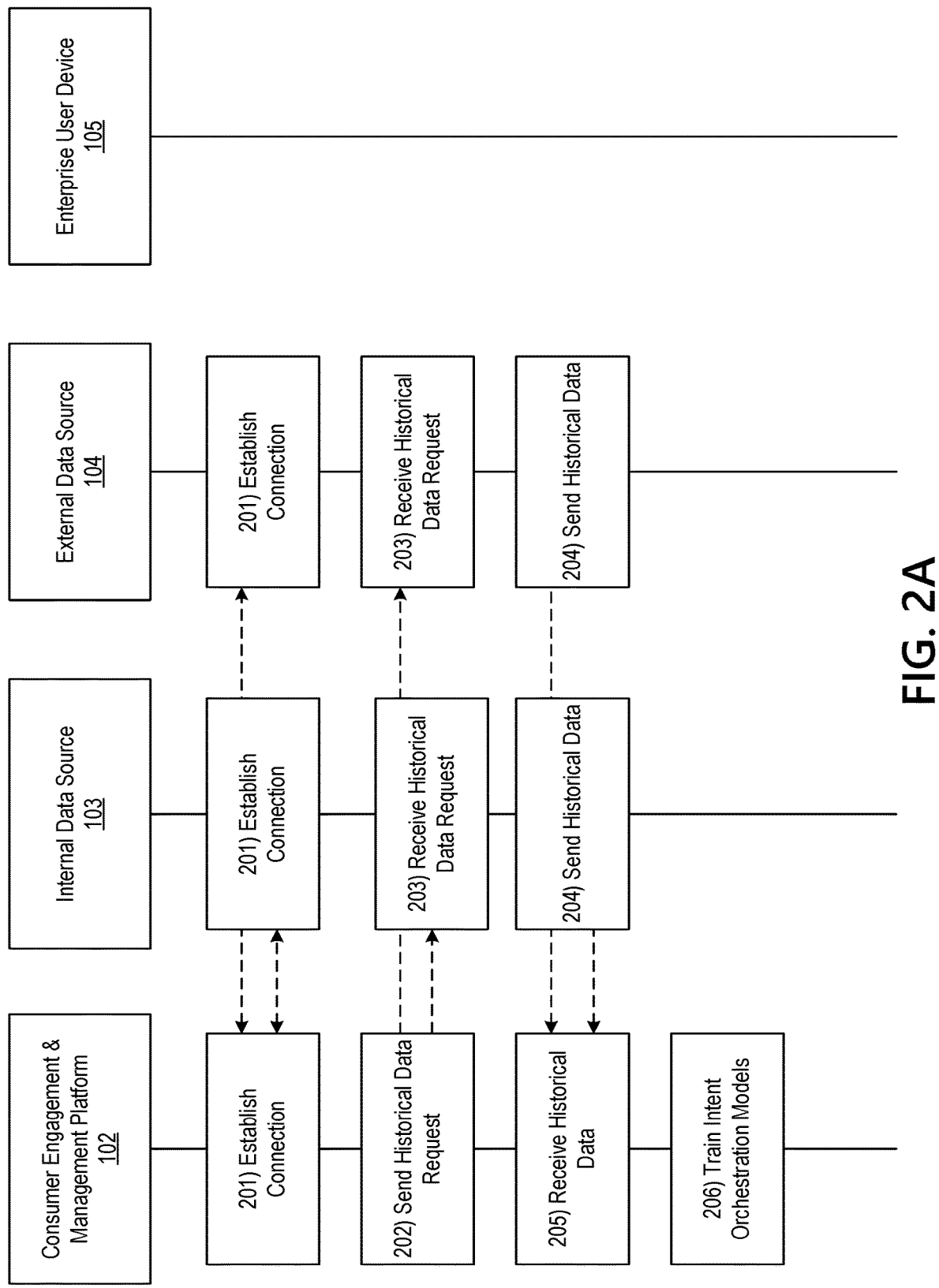

FIGS. 2A-2E depict an illustrative event sequence for implementing improved machine learning techniques to dynamically optimize intent driven orchestration of output generation and delivery in accordance with one or more example embodiments. Referring to FIG. 2A, at step 201, the consumer engagement and management platform 102 may establish a connection with internal data source 103 and external data source 104. For example, the consumer engagement and management platform 102 may establish a first wireless data connection with the internal data source 103 to link the consumer engagement and management platform 102 to the internal data source 103 (e.g., for purposes of requesting historical data) and may establish a second wireless data connection with the external data source 104 to link the consumer engagement and management platform 102 to the external data source 104 (e.g., for purposes of requesting historical data). In some instances, the consumer engagement and management platform 102 may determine whether a connection is established with the internal data source 103 and/or external data source 104. For example, if the consumer engagement and management platform 102 determines that a connection is already established with the internal data source 103 and/or the external data source 104, the consumer engagement and management platform 102 might not re-establish one or more of the connections. If a connection was not previously established with the internal data source 103 and/or the external data source 104, the consumer engagement and management platform 102 may establish the first wireless data connection and/or second wireless data connection as described herein.

At step 202, the consumer engagement and management platform 102 may send a request for internal historical data to the internal data source 103 and a request for external historical data to the external data source 104. In some instances, the consumer engagement and management platform 102 may send the request for internal historical data to the internal data source 103 via the communication interface 113 and while the first wireless data connection is established. Additionally or alternatively, the consumer engagement and management platform 102 may send the request for external historical data to the external data source 104 via the communication interface 113 and while the second wireless data connection is established. In some instances, the consumer engagement and management platform 102 may repeatedly send the historical data requests at a predetermined interval. Additionally or alternatively, in sending the historical data requests, the consumer engagement and management platform 102 may request that the internal data source 103 and/or the external data source 104 send data to the consumer engagement and management platform 102 as it is received (e.g., to sync the data with the consumer engagement and management platform 102 as it is received). In doing so, the consumer engagement and management platform 102 may maintain an up to date collection of internal and external data for use in one or more machine learning models and/or datasets. In referring to this requested data as "historical," the disclosure herein refers to data that has been collected or otherwise sent to the internal data source 103 and/or external data source, but that may in some instances be "live" or "current" data and is not limited to being "historical" in the traditional sense of the word. For example, the analysis described throughout may effectively be performed in near or substantially "real-time."

At step 203, the internal data source 103 and/or external data source 104 may receive the historical data requests sent at step 202. For example, the internal data source 103 may receive the request for internal historical data while the first wireless data connection is established, and the external data source 104 may receive the request for external historical data while the second wireless data connection is established.

At step 204, the internal data source 103 and/or the external data source 104 may send historical data to the consumer engagement and management platform 102. In some instances, the internal data source 103 may send historical data while the first wireless data connection is established and the external data source 104 may send historical data while the second wireless data connection is established. In some instances, as described above, the internal data source 103 and/or external data source 104 may send the historical data based on receiving the historical data requests from the consumer engagement and management platform 102. In some instances, the internal data source 103 and/or external data source 104 may send historical data to the consumer engagement and management platform 102 as it is collected or otherwise received (e.g., to maintain a data sync between the consumer engagement and management platform 102, internal data source 103, and/or external data source 104). In some instances, in sending the internal historical data, the internal data source 103 may send prior call data, prior interaction data, clickstream data, claims data, preferences, voice transcriptions, or the like. Additionally or alternatively, in sending external historical data, the external data source 104 may send prior call data, prior interaction data, clickstream data, telematics data, timestamps, demographics data, life event data, social event data, geospatial data, weather data, preferences, voice transcriptions, or the like.

At step 205, the consumer engagement and management platform 102 may receive the historical data sent at step 204. For example, the consumer engagement and management platform 102 may receive the historical data via the communication interface 113 and while the first and/or second wireless data connections are respectively established.

At step 206, the consumer engagement and management platform 102 may train one or more intent orchestration models. For example, the consumer engagement and management platform 102 may train one or more one or more intent identification models (e.g., to identify consumer intent based on the historical data), one or more engagement output generation modules (e.g., to generate an engagement output for the consumer based on the identified intent), one or more communication channel modules (e.g., to select a communication channel based on the engagement output), or the like. In doing so, the consumer engagement and management platform 102 may initially request that the historical data be manually labelled with an identified intent (e.g., by an employee of an enterprise organization that maintains or otherwise controls the consumer engagement and management platform 102, or the like). As more labelled historical data is received, the consumer engagement and management platform 102 may begin automatically labelling the historical data using the labelled datasets. In doing so, the consumer engagement and management platform 102 may assemble a labelled dataset of historical internal and external data that may be compared to future (which may, in some instances, be received as substantially "real-time" data) internal and external data to identify intents corresponding to that future data. In some instances, in training the intent orchestration models, the consumer engagement and management platform 102 may train one or more supervised learning models such as support vector machines, linear regression, logistic regression, naïve Bayes, linear discriminant analysis, decision trees, k-nearest neighbor, neural networks, similarity learning, or the like.

Figure 2B:
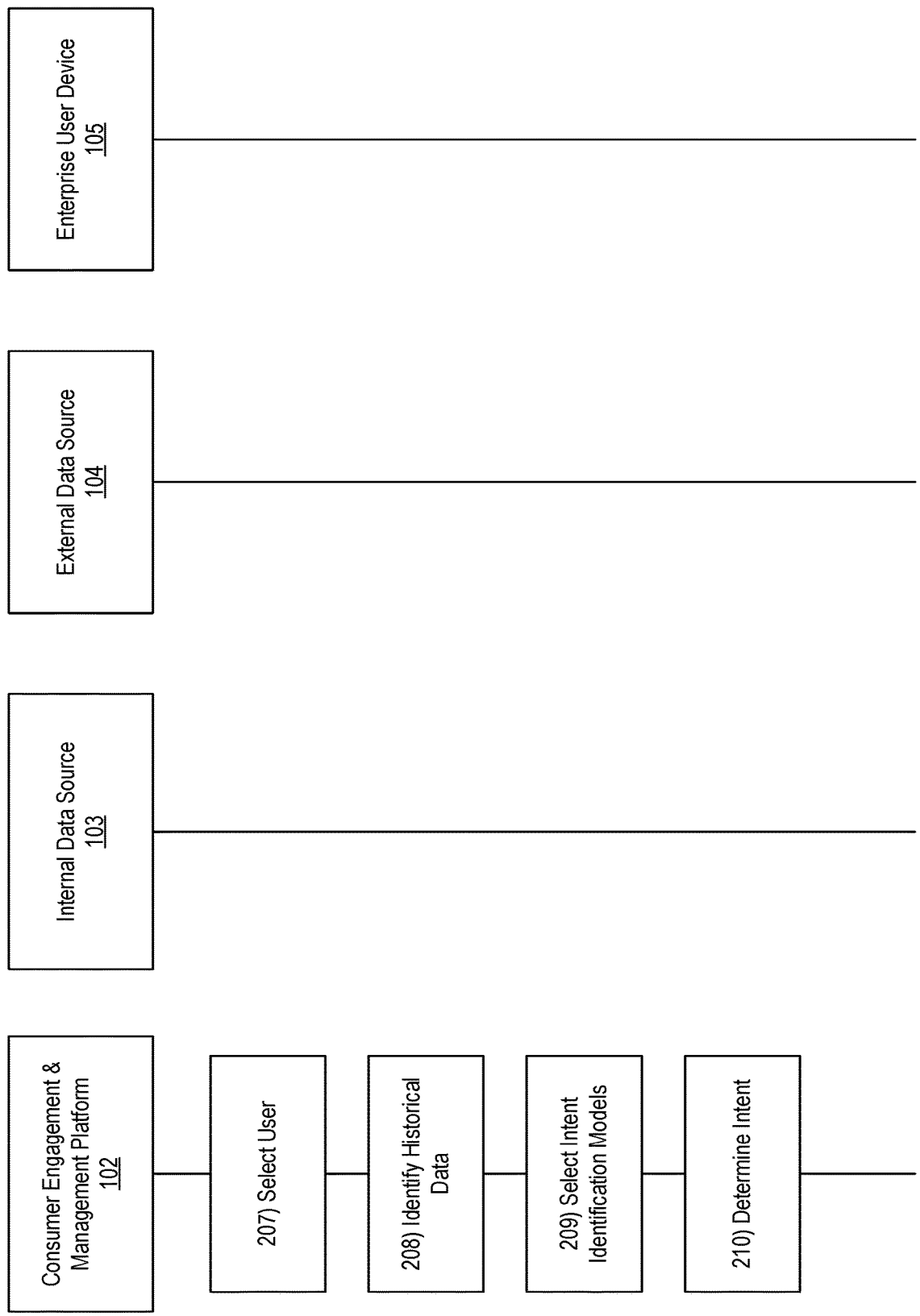

Referring to FIG. 2B, at step 207, the consumer engagement and management platform 102 may select a user. For example, in some instances, the consumer engagement and management platform 102 may select the user based on detection of internal or external data corresponding to the user. In some instances, the consumer engagement and management platform 102 may select the user in a random manner.

At step 208, the consumer engagement and management platform 102 may identify historical data corresponding to the user. In some instances, in addition or as an alternative to identifying historical data, the consumer engagement and management platform 102 may receive live/real-time data from the internal data source 103 and/or external data source 104. For example, with regard to steps 207 and 208, in some instances, the consumer engagement and management platform 102 may select a user at random and use historical stored data corresponding to the user to generate insights and outputs accordingly. Additionally or alternatively, the analysis process may be triggered by receipt of near or substantially "real-time" data related to the user, which may indicate that an output should be determined (e.g., determination that the user is driving to a dealership, was in an accident, or the like).

At step 209, the consumer engagement and management platform 102 may select one or more intent identification models using the data identified at step 208. For example, based on the data, the consumer engagement and management platform 102 may select a model to predict consumer reason for contact, a model to predict importance of consumer need, a model to predict idea product offering/features, a model to predict that a consumer is purchasing a car, a model to predict whether a crash has occurred, a model to determine a consumer cohort, or the like. For example, the consumer engagement and management platform 102 may select a model to use based on similarities of the data collected to the data deployed in the various models. In doing so, the consumer engagement and management platform 102 may select the most effective model for analysis of the data.

At step 210, the consumer engagement and management platform 102 may apply the one or more selected intent identification models to identify an intent of the user. In some instances, the consumer engagement and management platform 102 may determine similarities between data corresponding to the user and historical data in the models, and may identify intents corresponding to the similar historical data. For example, the consumer engagement and management platform 102 may use the one or more selected intent identification models to identify what interactions have previously taken place with the user, how immediate a need is to the user, what is unique about a situation, a reason for contact, offers/features the user is interested in, that the user is purchasing a car, or the like. For example, the consumer engagement and management platform 102 may apply the one or more intent identification models to determine an intent of the user (e.g., add coverage, buy a car, get help, pay a bill, compare options, cancel policy, file claim, bundle home and auto, or the like).

As an example, in applying the one or more selected intent identification models, the consumer engagement and management platform 102 may use voice transcription and/or clickstream data to identify a reason that the user contacted the enterprise organization. As another example, the consumer engagement and management platform 102 may use demographics and/or clickstream data to interpret whether the user is actively browsing options, frequently asked question pages, or the like. As yet another example, the consumer engagement and management platform 102 may use demographics, clickstream data, life events, social events, or the like to determine relevant product offerings. As yet another example, the consumer engagement and management platform 102 may use geospatial triggers, timestamps, life events, or the like to interpret location data and determine that the user is visiting car dealerships. As yet another example, the consumer engagement and management platform 102 may use telematics data, timestamps, geospatial triggers, or the like to interpret driving data and determine whether a crash has occurred.

Figure 2C:
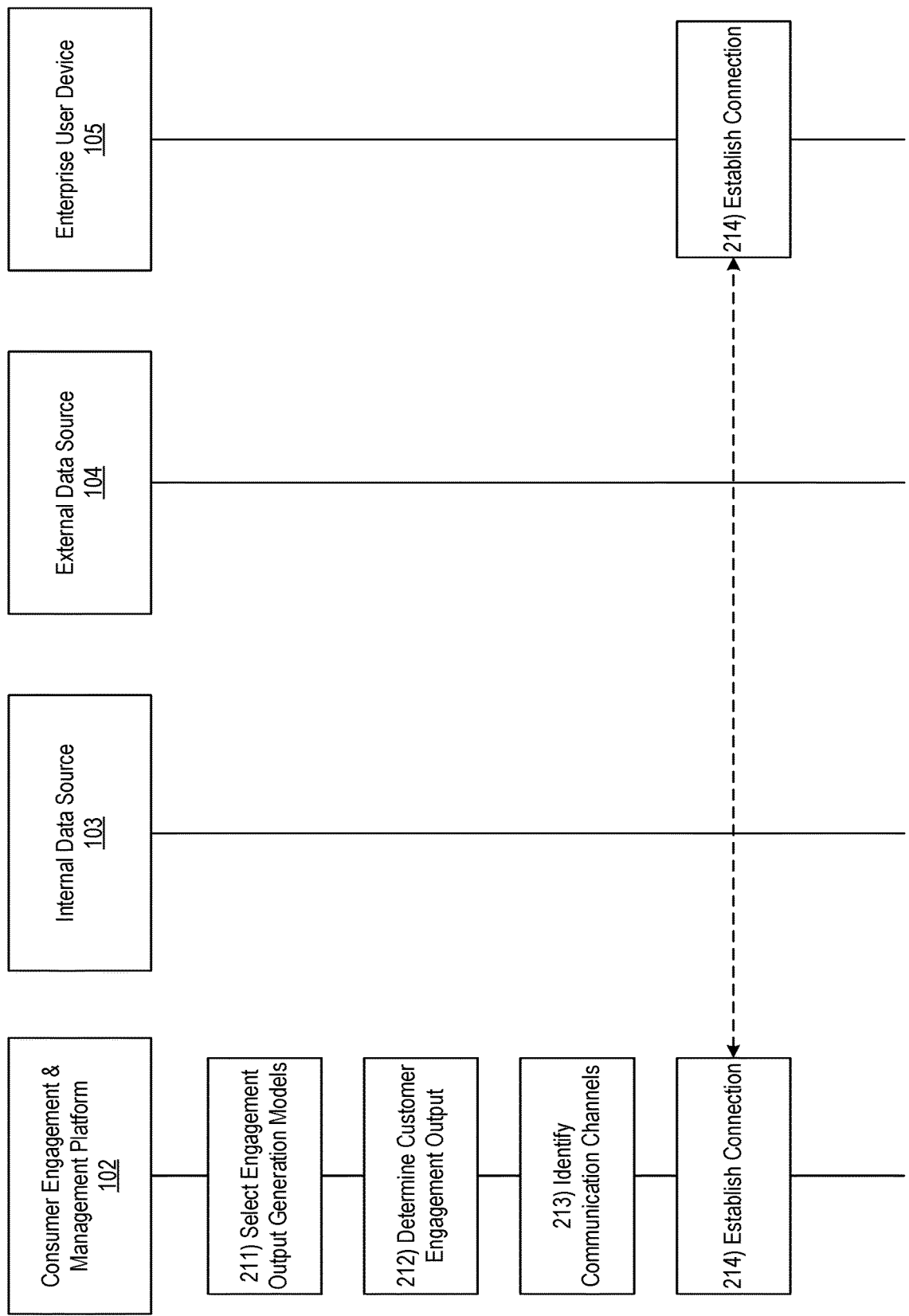

Referring to FIG. 2C, at step 211, the consumer engagement and management platform 102 may select one or more engagement output generation models using the intent identified at step 210 (e.g., the consumer engagement and management platform 102 may use the output of the intent identification models to determine which engagement output generation model(s) to apply). For example, the consumer engagement and management platform 102 may host a model to determine a best method of resolution, a model to determine whether an automated solution or human interaction is appropriate, a model to determine a change in consumer cover needs, a model to determine a type of loss/severity of loss, a model to determine a best method of contact, or the like. For example, the consumer engagement and management platform 102 may select different models if the intent was determined based on user initiated actions than if the intent was determine proactively based on a user's determined intent. In doing so, the consumer engagement and management platform 102 may select the most effective model for generation of a consumer engagement output (e.g., the consumer engagement and management platform 102 may select a model that may generate a most effective customer engagement output based on the identified intent). For example, a first model may be more effective in generation of a claim and a second model may be more effective in generation of a quote.

At step 212, the consumer engagement and management platform 102 may apply the one or more selected engagement output generation models to generate a customer engagement output. In some instances, the consumer engagement and management platform 102 may determine similarities between the identified intent and historical intent data stored in the model. For example, the consumer engagement and management platform 102 may use the one or more engagement output generation models to identify customer engagement outputs corresponding to the identified intent. In doing so, the consumer engagement and management platform 102 may select one or more engagement output generation models to apply based on the intent identified (e.g., different models may be applied based on the input data), and may apply the one or more engagement output generation models to generate a customer engagement output (e.g., assemble a quote, construct an answer, calculate an amount owed, populate pricing options, schedule an inspection, prepare a claim, or the like).

As an example, in applying the one or more selected engagement generation models, the consumer engagement and management platform 102 may identify an optimal path of resolution based on a reason for customer contact. As another example, the consumer engagement and management platform 102 may add consumer and relevant information to an agent queue based on a determination that the user is actively browsing options, frequently asked question lists, or the like. As yet another example, the consumer engagement and management platform 102 may prepare product recommendations based on clickstream and customer cohort information. As yet another example, the consumer engagement and management platform 102 may prepare a workflow for adding a new car to a policy based on a determination that the user is visiting dealerships. As yet another example, the consumer engagement and management platform 102 may prepare a workflow related to filing a claim based on a determination that a crash has occurred.

At step 213, the consumer engagement and management platform 102 may identify one or more communication channels for use in engaging the user based on the identified intent and/or consumer engagement output. For example, the consumer engagement and management 102 may select a communication format that may be most likely to provoke consumer engagement with the customer engagement output. For example, the consumer engagement and management platform 102 may apply a communication channel model to identify an optimal communication channel for communication of the consumer engagement output (e.g., communication channel that will make interaction with the consumer engagement output by the user most likely). For example, the consumer engagement and management platform 102 may identify likelihood of successful interaction with the consumer engagement output using various communication channels based on historical success for the various communication channels for similar consumer engagement outputs. In identifying the consumer engagement and management platform 102 may determine that the consumer engagement output should be communicated using chatbots, automated emails, texts, toggle options, push notifications, third party application programming interfaces (AMAZON ALEXA™, GOOGLE HOME™, or the like), social media postings, automated processes, manual human processes, co-browsing with an agent, a user interface (e.g., shaping a user interface to share information, add a vehicle to a profile, file a claim, or the like) or the like. In some instances, in identifying the communication channel, the consumer engagement and management platform 102 may format the consumer engagement output based on the communication channel.

As an example, based on a determination that the customer engagement output is a quote, the consumer engagement and management platform 102 may determine that the most effect communication channel is an automated chatbot, and may format the customer engagement output accordingly. As another example, based on a determination that the customer engagement output is instructions to file a claim, the consumer engagement and management platform 102 may determine that the most effective communication channel is a mobile application push notification including a link to filing a claim.

At step 214, the consumer engagement and management platform 102 may establish a connection with the enterprise user device 105. For example, the consumer engagement and management platform 102 may establish a third wireless data connection with the enterprise user device 105 to link the consumer engagement and management platform 102 to the enterprise user device 105 (e.g., for the purpose of sending interface display commands). In some instances, the consumer engagement and management platform 102 may identify whether or not a connection is already established with the enterprise user device 105. If a connection is already established with the enterprise user device 105, the consumer engagement and management platform 102 might not re-establish the connection. If a connection is not yet established with the enterprise user device 105, the consumer engagement and management platform may establish the third wireless data connection as described herein.

Figure 2D:
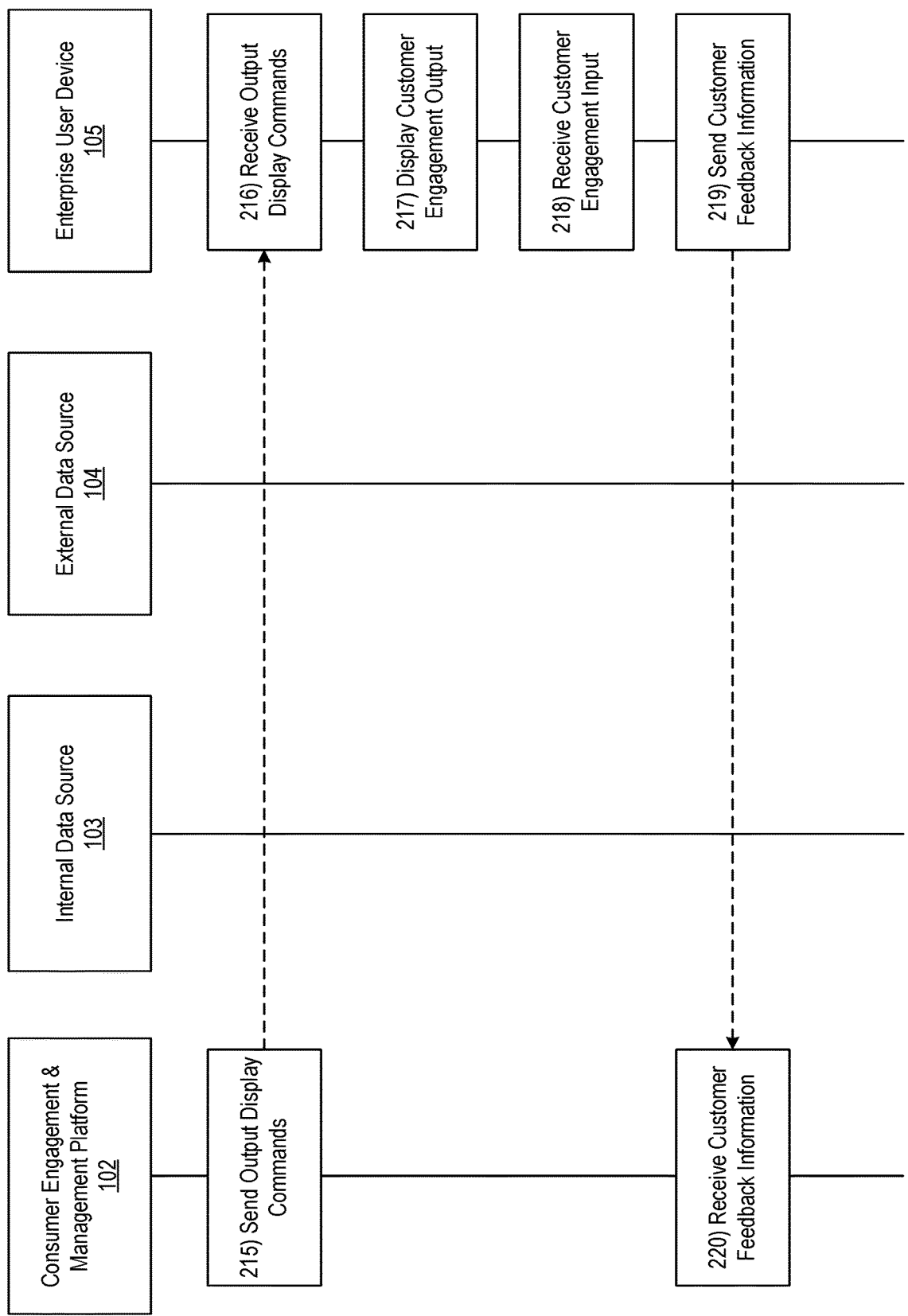

Referring to FIG. 2D, at step 215, the consumer engagement and management platform 102 may send one or more commands directing the enterprise user device 105 to display the customer engagement output (e.g., formatted based on the identified communication channel). For example, the consumer engagement and management platform 102 may send the one or more commands directing the enterprise user device 105 to display the customer engagement output via the communication interface and while the third wireless data connection is established.

At step 216, the enterprise user device 105 may receive the one or more commands directing the enterprise user device 105 to display the customer engagement output. In some instances, the enterprise user device 105 may receive the one or more commands directing the enterprise user device 105 to display the customer engagement output while the third wireless data connection is established.

At step 217, the enterprise user device 105 may display the customer engagement output. For example, the enterprise user device 105 may display the customer engagement output based on or in response to the one or more commands directing the enterprise user device 105 to display the customer engagement output received at step 216. For example, the enterprise user device 105 may display the customer engagement output formatted based on the identified communication channel (e.g., chatbots, automated emails, texts, toggle options, push notifications, third party application programming interfaces (AMAZON ALEXA™, GOOGLE HOME™, or the like), social media postings, or the like). In some instances, in displaying the customer engagement output, the enterprise user device 105 may display a graphical user interface similar to graphical user interface 405, which is shown in FIG. 4. For example, the enterprise user device 105 may display a chatbot interface where the user may interact with an automated service to answer questions, perform tasks, or the like. In some instances, in displaying the customer engagement output, the enterprise user device 105 may display a graphical user interface similar to graphical user interface 505, which is shown in FIG. 5. For example, the enterprise user device 105 may display a notification including a reminder to file a claim, and a click to the submission page.

At step 218, the enterprise user device 105 may receive a customer engagement input corresponding to an interaction between the user and the customer engagement interface. In some instances, the enterprise user device 105 may receive a positive customer engagement input (e.g., the customer engagement output was applicable to the user and the user performed one or more actions based on the customer engagement output) or a negative customer engagement input (e.g., the customer engagement output was not application or of interest to the user, the user did not interact with the customer engagement output, or the like. In these instances, the enterprise user device 105 may receive the customer engagement input via a display of the enterprise user device.

At step 219, the enterprise user device 105 may send customer feedback information to the consumer engagement and management platform 102. For example, the enterprise user device 105 may send information indicating a user interaction with the customer engagement output. In some instances, the enterprise user device 105 may send the customer feedback information to the consumer engagement and management platform 102 while the third wireless data connection is established.

At step 220, the consumer engagement and management platform 102 may receive the customer feedback information from the enterprise user device 105. For example, the consumer engagement and management platform 102 may receive the customer feedback information via the communication interface 113 and while the third wireless data connection is established.

Referring to FIG. 2E, at step 221, the consumer engagement and management platform 102 may update the one or more intent orchestration models based on the customer feedback information. For example, the consumer engagement and management platform 102 may reinforce the one or more intent orchestration models if the customer feedback information is positive and may modify the one or more intent orchestration models if the customer feedback is negative. In doing so, the consumer engagement and management platform 102 may dynamically improve the capabilities of the various intent orchestration models and improve accuracy of the customer engagement output generation process.

Accordingly, one or more aspects of the systems and methods described herein may be used to address technical difficulties associated with automated customer engagement. By applying multiple machine learning models, and using outputs of the various models to select (and subsequently apply) subsequent models, the effectiveness and accuracy of such customer engagement may be increased. For example, by using outputs of a first set of models as inputs to second set of models, these machine learning outputs may be continually refined. Furthermore, receipt of undesired solicitation or engagement may be reduced, and receipt of desired assistance may be increased.

As a simplified example of the systems and methods described herein, based on a user's location, the consumer engagement and management platform 102 may predict that the user is purchasing a car, assemble a quote, and present offers through an automated text (e.g., which may be the preferred channel for the user. As another example, based on the user's location and telematics data, the consumer engagement and management platform 102 may recognize that a vehicle has been involved in an accident, and may predict that the user is heading to a dealership for service. Accordingly, in this example, the consumer engagement and management platform may use a mobile application to push a link that enables the user to file a claim. As illustrated, based on comprehensive information and models, machine learning may establish customer intent with a higher degree of certainty, and may simultaneously execute multiple workflows and deliver multiple experiences.

Figure 3:
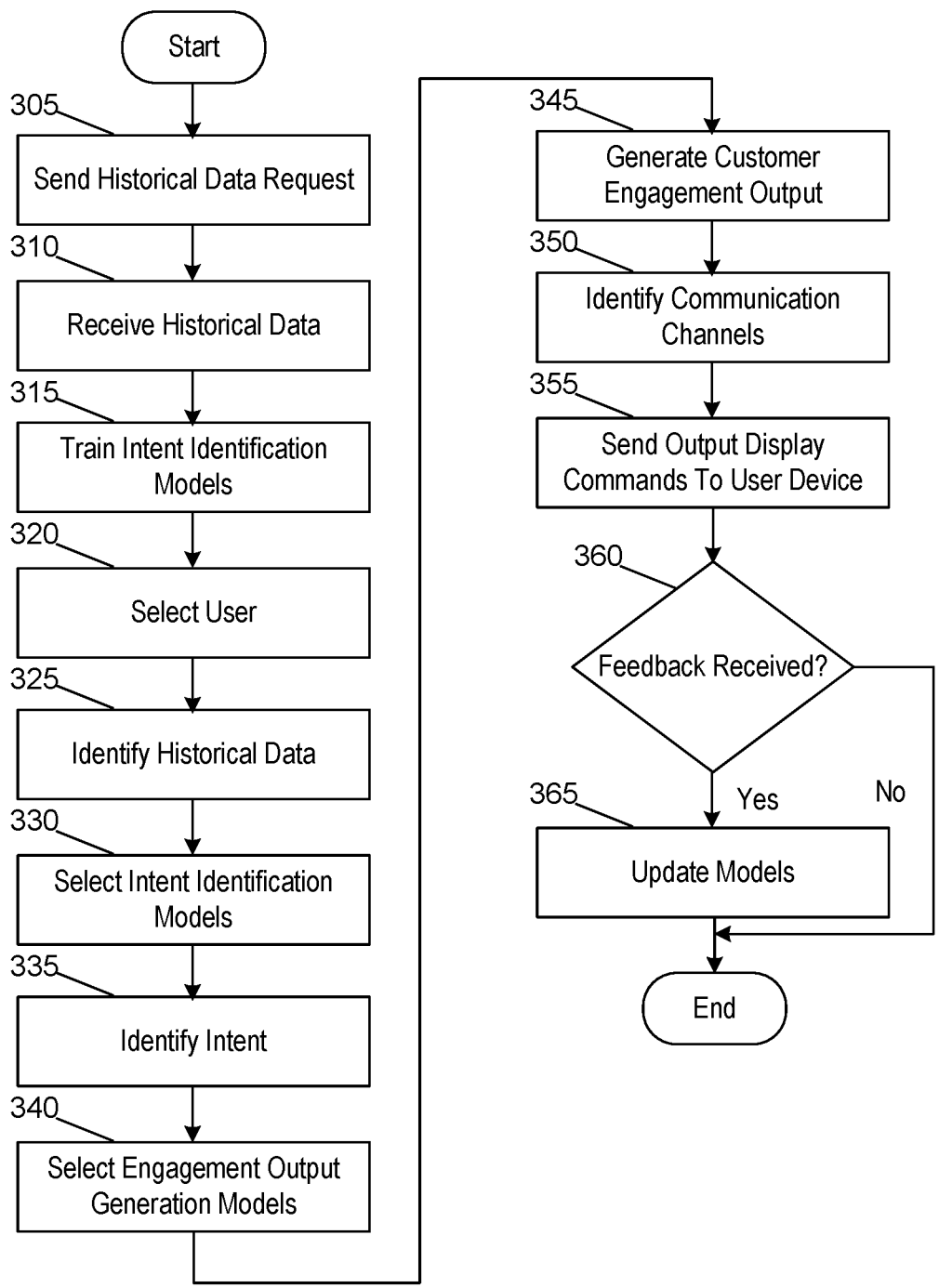
FIG. 3 depicts an illustrative method for implementing improved machine learning techniques to dynamically optimize intent driven orchestration of output generation and delivery in accordance with one or more example arrangements discussed herein.

FIG. 3 depicts an illustrative method for implementing improved machine learning techniques to dynamically optimize intent driven orchestration of output generation and delivery in accordance with one or more example embodiments. Referring to FIG. 3, at step 305, a computing platform having at least one processor, a communication interface, and memory may send a request for historical data to internal and external data sources. At step 310, the computing platform may receive historical data from the internal and external data sources. At step 315, the computing platform may train one or more intent identification models using the historical data. At step 320, the computing platform may select a user. At step 325, the computing platform may identify historical data corresponding to the user. At step 330, the computing platform may select one or more intent identification models based on the historical data. At step 335, the computing platform may apply the one or more intent identification models to identify an intent. At step 340, the computing platform may select one or more engagement output generation models based on the identified intent. At step 345, the computing platform may use the one or more engagement output generation models to generate a customer engagement output. At step 350, the computing platform may identify one or more communication channels based on the intent and the customer engagement output, may format the customer engagement output based on the identified communication channels. At step 355, the computing platform may send one or more commands directing an enterprise user device to display the customer engagement output. At step 360, the computing platform may determine whether or not feedback was received from the enterprise user device. If feedback was not received, the method may end. If feedback was received, the computing platform may proceed to step 365. At step 365, the computing platform may update the one or more intent identification models based on the feedback.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and memory storing computer-readable instructions that, when executed by the at least one processor, cause the computing platform to:
   receive historical data from a plurality of sources comprising at least an internal data source of the computing platform and an external data source external from and communicatively coupled to the computing platform, wherein the historical data corresponds to an individual;
   identify data corresponding to the individual using one or more intent orchestration models trained using the historical data that corresponds to the individual, wherein the one or more intent orchestration models include a plurality of intent identification models, one or more engagement output generation modules, and one or more communication channel modules;
   select, based on the data corresponding to the individual, one of the plurality of intent identification models;
   identify, using the selected one of the plurality of intent identification models, an intent of the individual;
   select, based on the intent of the individual, one or more engagement output generation models;
   generate, using the selected one or more engagement output generation models, a customer engagement output;
   identify, using one or more communication channel models, a communication channel, wherein the one or more communication channel models identify the communication channel by analyzing the intent of the individual to determine the communication channel that will provoke the individual to engage with the customer engagement output; and send one or more commands directing an enterprise user device to format the customer engagement output based on the communication channel to generate a communication channel format for the customer engagement output and display the customer engagement output on a graphical user interface associated with the communication channel, the customer engagement output generated using the selected one or more engagement output generation models selected based on the intent of the individual identified using the selected one of the plurality of intent identification models, wherein sending the one or more commands directing the enterprise user device to display the customer engagement output causes the enterprise user device to display the customer engagement output using the communication channel and on the graphical user interface associated with the communication channel in the communication channel format;

continuously train the one or more intent orchestration models based on post-historical data comprising the identified intent and real-time data corresponding to the individual, wherein training of the one or more intent orchestration models comprises training one or more supervised learning models to automatically assemble a labelled dataset of the historical data by initially inputting a manually labelled dataset into the one or more intent orchestration models and automatically generating the labelled dataset as a function of the manually labelled dataset, such that the one or more intent orchestration models compare the labelled dataset to a real-time dataset comprising the post-historical data to identify the intent of the individual;

wherein generation of the customer engagement output comprises comparison of the labelled dataset of the historical data to the real-time dataset to further identify the intent of the individual based on the real-time dataset.

2. The computing platform of claim 1, wherein the internal data source stores internal historical data, and the external data source stores external historical data.

3. The computing platform of claim 1, wherein the computing platform is synced with the plurality of sources and receives the historical data in real time as it is received by the plurality of sources.

4. The computing platform of claim 1, wherein the historical data comprises one or more of: prior call data, prior interaction data, clickstream data, claims data, preferences, and voice transcriptions.

5. The computing platform of claim 1, wherein the one or more supervised learning models comprises one or more of: support vector machines models, linear regression models, logistic regression models, naïve Bayes models, linear discriminant analysis models, decision trees models, k-nearest neighbor models, neural networks models, and similarity learning models.

6. The computing platform of claim 1, wherein identifying the data corresponding to the individual comprises receiving real-time data corresponding to the individual indicating that the customer engagement output should be generated.

7. The computing platform of claim 6, wherein the real-time data comprises information indicating that the individual was in an accident.

8. The computing platform of claim 1, wherein selecting the one of the plurality of intent identification models comprises selecting one of: a model to predict consumer reason for contact, a model to predict importance of consumer need, a model to predict idea product offering/features, a model to predict that a consumer is purchasing a car, a model to predict whether a crash has occurred, and a model to determine a consumer cohort.

9. The computing platform of claim 1, wherein identifying the intent comprises identifying one or more of: what interactions have previously taken place with the individual, how immediate a need is to the individual, what is unique about a situation, a reason for contact, offers/features the individual is interested in, or that the individual is purchasing a car.

10. The computing platform of claim 1, wherein identifying the intent comprises one or more of:

using voice transcription or clickstream data to identify a reason that the individual contacted an enterprise organization, using demographics or clickstream data to interpret whether the individual is actively browsing options or identify frequently asked questions, using demographics, clickstream data, life events, or social event to determine product offerings, using geospatial triggers, timestamps, or life events to interpret location data, or using telematics data, timestamps, or geospatial triggers to interpret driving data and determine whether a crash occurred.

11. The computing platform of claim 1, wherein selecting, the one or more engagement output generation models comprises selecting a model to determine a best method of resolution, a model to determine whether an automated solution or human interaction is appropriate, a model to determine a change in consumer cover needs, a model to determine a type of loss/severity of loss, or a model to determine a best method of contact.

12. The computing platform of claim 1, wherein the customer engagement output comprises one or more of: a quote, an answer, an amount owed, pricing options, a scheduled inspection, or a claim.

13. The computing platform of claim 1, wherein generating the customer engagement output comprises one or more of:

identifying a path of resolution based on a reason for customer contact, adding consumer and relevant information to an agent queue based on a determination that the individual is actively browsing options or frequently asked question lists, preparing product recommendations based on clickstream or customer cohort information, preparing a workflow for adding a new car to a policy based on a determination that the individual is visiting dealerships, or preparing a workflow related to filing a claim based on a determination that a crash has occurred.

14. The computing platform of claim 1, wherein identifying the communication channel comprises selecting a communication format most likely to provoke consumer engagement with the customer engagement output.

15. The computing platform of claim 1, wherein the communication channel comprises one of: a chatbot, an email, a text, a toggle option, a push notification, a third party application programming interface, a social media post, an automated process, a manual process, or a user interface, and wherein the customer engagement output is formatted based on the communication channel.

16. A method comprising:
at a computing platform comprising at least one processor, a communication interface, and memory:
receiving historical data from a plurality of sources comprising at least an internal data source of the computing platform and an external data source external from and communicatively coupled to the computing platform, wherein the historical data corresponds to an individual;
identify data corresponding to the individual using one or more intent orchestration models trained using the historical data that corresponds to the individual, wherein the one or more intent orchestration models include a plurality of intent identification models, one or more engagement output generation modules, and one or more communication channel modules;
selecting, based on the data corresponding to the individual, one of the intent identification models;
identifying, using the selected one of the plurality of intent identification models, an intent of the individual;
selecting, based on the intent of the individual, one or more engagement output generation models;
generating, using the selected one or more engagement output generation models, a customer engagement output;
identifying, using one or more communication channel models, a communication channel, wherein the one or more communication channel models identify the communication channel by analyzing the intent of the individual to determine the communication channel that will provoke the individual to engage with the customer engagement output;
sending one or more commands directing an enterprise user device to format the customer engagement output based on the communication channel to generate a communication channel format for the customer engagement output and display the customer engagement output on a graphical user interface associated with the communication channel, the customer engagement output generated using the selected one or more engagement output generation models selected based on the intent of the individual identified using the selected one of the plurality of intent identification models, wherein sending the one or more commands directing the enterprise user device to display the customer engagement output causes the enterprise user device to display the customer engagement output using the communication channel and on the graphical user interface associated with the communication channel in the communication channel format; and
continuously training the one or more intent orchestration models based on post-historical data comprising the identified intent and real-time data corresponding to the individual;
wherein training the one or more intent orchestration models further comprises training one or more supervised learning models to automatically assemble a labelled dataset of the historical data by initially inputting a manually labelled dataset into the one or more intent orchestration models and automatically generating the labelled dataset as a function of the manually labelled dataset;
wherein generating the customer engagement output further comprises comparing the labelled dataset of the historical data to a real-time dataset to further identify the intent of the individual based on the real-time dataset.

17. The method of claim 16, wherein the internal data source stores internal historical data, and the external data source stores external historical data.

18. The method of claim 16, wherein the computing platform is synced with the plurality of sources and receives the historical data in real time as it is received by the plurality of sources.

19. One or more non-transitory computer-readable media storing instructions that, when executed by a computing platform comprising at least one processor, a communication interface, and memory, cause the computing platform to:
receive historical data from a plurality of sources comprising at least an internal data source of the computing platform and an external data source external from and communicatively coupled to the computing platform, wherein the historical data corresponds to an individual;
identify data corresponding to the individual using one or more intent orchestration models trained using the historical data that corresponds to the individual, wherein the one or more intent orchestration models include a plurality of intent identification models, one or more engagement output generation modules, and one or more communication channel modules;
select, based on the data corresponding to the individual, one of the plurality of intent identification models;
identify, using the selected one of the plurality of intent identification models, an intent of the individual;
select, based on the intent of the individual, one or more engagement output generation models;
generate, using the selected one or more engagement output generation models, a customer engagement output;
identify, using one or more communication channel models, a communication channel, and wherein the one or more communication channel models identify the communication channel by analyzing the intent of the individual to determine the communication channel that will provoke the individual to engage with the customer engagement output;
send one or more commands directing an enterprise user device to format the customer engagement output based on the communication channel to generate a communication channel format for the customer engagement output and display the customer engagement output on a graphical user interface associated with the communication channel, the customer engagement output generated using the selected one or more engagement output generation models selected based on the intent of the individual identified using the selected one of the plurality of intent identification models, wherein sending the one or more commands directing the enterprise user device to display the customer engagement output causes the enterprise user device to display the customer engagement output using the communication channel and on the graphical user interface associated with the communication channel in the communication channel format; and
continuously train the one or more intent orchestration models based on post-historical data comprising the identified intent and real-time data corresponding to the individual;

wherein training of the one or more intent orchestration models comprises training one or more supervised learning models to automatically assemble a labelled dataset of the historical data by initially inputting a manually labelled dataset into the one or more intent orchestration models and automatically generating the labelled dataset as a function of the manually labelled dataset, and generation of the customer engagement output comprises comparison of the labelled dataset of the historical data to a real-time dataset to identify the intent of the individual based on the real-time dataset.

* * * * *